R. M. KINNARD.
TOY.
APPLICATION FILED JULY 22, 1918.
1,282,433.
Patented Oct. 22, 1918.
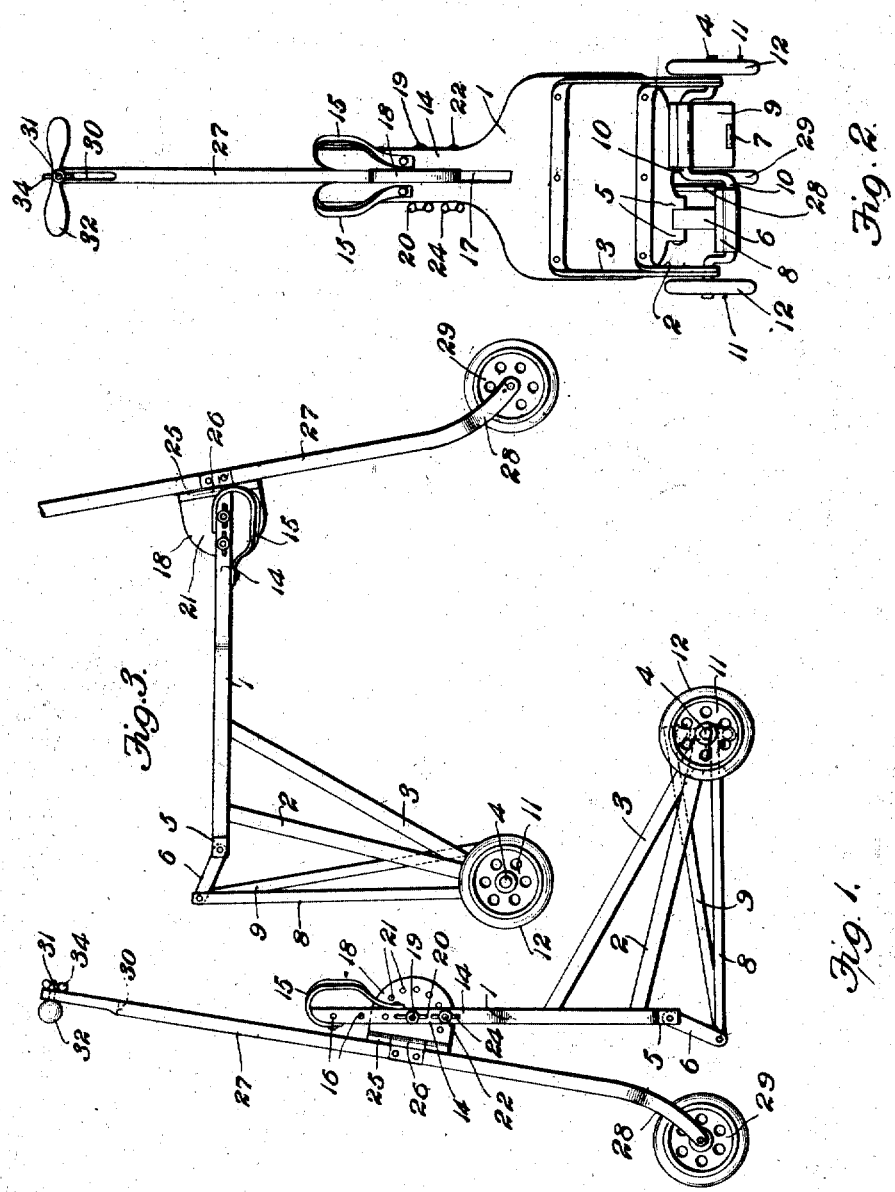
INVENTOR,
Robert M. Kinnard
By J. W. Bond
ATTORNEY.

UNITED STATES PATENT OFFICE.

ROBERT M. KINNARD, OF TRENTON, NEW JERSEY.

TOY.

1,282,433.  Specification of Letters Patent.  Patented Oct. 22, 1918.

Application filed July 22, 1918.  Serial No. 246,020.

*To all whom it may concern:*

Be it known that I, ROBERT M. KINNARD, a citizen of the United States, residing at Trenton, in the county of Mercer and State of New Jersey, have invented a new and useful Toy, of which the following is a specification.

This invention relates to toys and more especially to a toy of the vehicle class, the object being to construct a toy of this character that can be quickly and easily converted into any one of a plurality of different forms.

With this object in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Figure 1 is a side elevation of my device as arranged to be operated by a child in standing position.

Fig. 2 is a rear view as seen in Fig. 1.

Fig. 3 is a side elevation showing my device converted into the form to be used by a child in sitting position and with the upper portion of the handle bar broken away.

Similar numerals of reference indicate corresponding parts throughout the several figures of the drawings, in which—

As seen in Figs. 1 and 2 the member 1 which forms the upright in these two figures and the seat as seen in Fig. 3 is preferably formed of a single piece of hardwood and is connected by braces 2 and 3 to the rear axle 4. Projecting portions 5 which extend from one end of the member 1 are in the form of ears and are arranged to form hinged joints with one end of the links 6 and 7. To the links 6 and 7 are connected pedals 8 and 9 respectively, which pedals extend to off-set portions 10 formed on the rear axle. These off-set portions 10 extend in diametrically opposite directions and form cranks by which the rear axle may be rotated. On either end of the axle and fixed to rotate therewith is a wheel 11, which wheels may be provided with rubber tires 12.

At the end of the member 1 opposite the ears 5 is a pair of projections 14, which projections are equi-distantly spaced from the center line of the member 1 as shown. To each of the members 14 is attached a supporting handle 15 and extending laterally through the portions 14 is a series of apertures 16, which are arranged to register. A slot 17 is formed by the space between the members 14 and within this slot is designed to fit a disk-like portion 18 in which is formed a substantially central opening through which is designed to pass a bolt 19 inserted through two of the alined apertures 16 within the arms 14 and to be secured in such position by a wing nut 20. Arranged concentrically to the opening through which is inserted the bolt 19 is a plurality of openings 21 through one of which is designed to be inserted a bolt 22, which is also passed through two of the alined apertures 16, the said bolt 22 being secured by a wing nut 24. A forward portion of the disk-like member 18 is fashioned to form one member 25 of a hinge, the opposite member 26 being rigidly fixed to a steering post 27, the lower end of which is bifurcated as at 28 and carries a rubber tire wheel 29, similar to the wheels 11 upon the rear axle. A slot 30 is formed adjacent the upper extremity of the steering post 27 and is designed to receive a bolt 31 secured to the laterally extending hand grip or handle bar member 32. A wing-nut 34 secures the handle bar against the steering post.

In the form of my device shown in Figs. 1 and 2 the child will stand facing the member 1 and gripping the handle bar portion 32, which by virtue of the slot 30 may be adjusted to best suit the height of the child. The child will stand with one foot supported upon each of the pedals 8 and 9 and may, if desired, steady himself by gripping one of the handles 15 with one hand while operating the steering post 27 by the handle bar 32 with the other. By alternating the foot pressure upon the pedals 8 and 9 the rear axle 4 will be rotated to drive the vehicle.

In the form illustrated in Fig. 3 the member 1 has been swung over into a horizontal position and the steering post 27 removed from the position shown in the two previously described figures, by the unscrewing of the wing nuts 20 and 24 and the removal of the bolts 19 and 22. The member 18 is now inserted in the end of the slot 17 and secured by the bolts 19 and 22 and nuts 20 and 24 in the apertures 16 adjacent the ends of the members 14. The member 1 now forms a seat for the child, who will sit facing the steering post 27 and propel himself by engaging the ground or floor over which he is traveling, with his feet.

If it is desired to pull the vehicle in the form shown in Fig. 3 by a person walking in front thereof, the bolt 22 may be withdrawn and the disk-like member 18 swung around until the wheel 29 occupies a position to the rear of a vertical line extending downwardly from the center bolt 19. When one of the apertures 21 is now in register with a pair of apertures 16, the bolt 22 can be inserted and secured by a wing-nut 24. The handle portion 32 will now be projecting forwardly and may be grasped and used for pulling the vehicle.

Having fully described my invention what I claim as new and desire to secure by Letters Patent, is:

1. A device of the character described, comprising a seat portion, braces extending from said seat portion, an axle rotatably mounted within said braces, road engaging wheels fixedly mounted upon said axle and designed to rotate therewith, parallel arms extending from said seat portion, an adjustable plate removably secured between said arms, a steering post hingedly fixed to said plate, a steering handle adjustably secured to the upper portion of said steering post and designed to be operated to turn the said steering post, a road engaging wheel carried by the lower extremity of said steering post and adapted to turn therewith to steer the vehicle.

2. In a device of the character described, a seat portion, an axle rotatably mounted in braces extending from said seat portion, road engaging wheels carried by said axle and designed to rotate therewith, a pair of spaced parallel arms extending from said seat portion, an adjustable disk-like member removably secured between said spaced arms, a steering post hingedly secured to said disk-like member, a road engaging wheel carried by the lower end of said steering post, an operating handle carried by said steering post and designed to be moved to turn the said steering post and road engaging wheel to steer the vehicle, a plurality of alined apertures extending laterally through said spaced arms and a plurality of apertures formed in said disk-like member, two of said apertures in said disk-like member being designed to register with said apertures in said spaced arms when the seat portion is in horizontal position and means for securing said disk-like portion and spaced arms in such position.

3. In a toy of the character described, a convertible seat portion, spaced arms extending from said seat portion, a plurality of laterally alined apertures formed in said spaced arms, an apertured plate designed to fit between said spaced arms, a rod hingedly secured to said plate, a road engaging wheel rotatably mounted to the lower end of said rod and a handle portion secured to said rod and designed to be operated to swing the rod upon said hinge for steering, an axle rotatably mounted in braces fixed to said convertible seat portion, road engaging wheels fixed to the extremities of said axle, crank portions formed upon said axle, a pair of pedals rotatably mounted at one of their extremities upon the said crank portions and at their other extremities hingedly fixed to said seat portion, the said adjustable plate being designed to have certain of its apertures brought into register with certain of the apertures in said spaced arms when the seat portion is in horizontal position, and means for removably securing said plate and arms in such position, said plate being designed to be removed from such position and to have certain of its apertures register with said other apertures in said spaced arms when the convertible seat portion is in vertical position and to be removably secured in such position, the said pedals being designed to be operated to rock upon their hinges and to rotate the said axle when the convertible seat portion is in the last named position.

In testimony that I claim the above, I have hereunto subscribed my name.

ROBERT M. KINNARD.